US011269628B2

(12) United States Patent
Capalija et al.

(10) Patent No.: US 11,269,628 B2
(45) Date of Patent: Mar. 8, 2022

(54) PROCESSOR CORES USING PACKET IDENTIFIERS FOR ROUTING AND COMPUTATION

(71) Applicant: Tenstorrent Inc., Toronto (CA)

(72) Inventors: Davor Capalija, Toronto (CA); Ljubisa Bajic, Toronto (CA); Jasmina Vasiljevic, Toronto (CA)

(73) Assignee: Tenstorrent Inc., Toronto (CA)

( * ) Notice: Subject to any disclaimer, the term of this patent is extended or adjusted under 35 U.S.C. 154(b) by 120 days.

(21) Appl. No.: 16/902,035

(22) Filed: Jun. 15, 2020

(65) Prior Publication Data

US 2020/0401402 A1    Dec. 24, 2020

Related U.S. Application Data

(60) Provisional application No. 62/863,042, filed on Jun. 18, 2019.

(51) Int. Cl.
*G06F 15/80* (2006.01)
*G06F 9/34* (2018.01)
*G06F 9/30* (2018.01)
*G06F 8/41* (2018.01)

(52) U.S. Cl.
CPC ............... *G06F 9/30* (2013.01); *G06F 8/427* (2013.01)

(58) Field of Classification Search
CPC ..... G06N 3/063; G06F 15/82; G06F 15/8046; G06F 9/34; H04L 49/25; H04L 45/74
See application file for complete search history.

(56) References Cited

U.S. PATENT DOCUMENTS

| | | | |
|---|---|---|---|
| 6,453,360 B1 | 9/2002 | Muller et al. | |
| 6,650,640 B1 | 11/2003 | Muller et al. | |
| 8,001,266 B1* | 8/2011 | Gonzalez | G06F 15/177 709/238 |
| 2004/0250046 A1* | 12/2004 | Gonzalez | G06F 15/17337 712/11 |
| 2005/0108518 A1 | 5/2005 | Pandya | |
| 2005/0226238 A1 | 10/2005 | Hoskote et al. | |

(Continued)

OTHER PUBLICATIONS

Extended European Search Report dated Dec. 23, 2020 from European Application No. 20179923.6, 8 pages.

(Continued)

*Primary Examiner* — Jacob Petranek
(74) *Attorney, Agent, or Firm* — Daylight Law, P.C.

(57) ABSTRACT

Processor cores using packet identifiers for routing and computation are disclosed. One method includes executing a complex computation using a set of processing cores. The method includes routing a set of packets using a set of packet identifiers and executing a set of instructions. The set of instructions are defined using a set of operand identifiers. The operand identifiers represent packet identifiers in the set of packet identifiers. In specific implementations the set of the operand identifiers represent packet identifiers in the set of packet identifiers in that a set of memories on the set of processing cores stores data values in common association with both the set of packets, and a set of operands identified by the set of operand identifiers. In specific implementations the set of operand identifiers and packet identifiers are unambiguously mapped to an underlying set of application datums of the complex computation.

30 Claims, 8 Drawing Sheets

(56) References Cited

U.S. PATENT DOCUMENTS

| | | | |
|---|---|---|---|
| 2008/0215820 A1* | 9/2008 | Conway | G06F 12/082 |
| | | | 711/141 |
| 2009/0016355 A1* | 1/2009 | Moyes | H04L 45/02 |
| | | | 370/395.31 |
| 2014/0052923 A1* | 2/2014 | Ikeda | G06F 15/173 |
| | | | 711/130 |
| 2015/0319086 A1 | 11/2015 | Tripathi et al. | |
| 2016/0294710 A1 | 10/2016 | Sreeramoju | |
| 2017/0302530 A1 | 10/2017 | Wolting | |
| 2018/0139153 A1* | 5/2018 | Moradi | G06N 3/063 |
| 2019/0286972 A1* | 9/2019 | El Husseini | G06N 3/063 |

OTHER PUBLICATIONS

Hayashi et al., "Parallelization in an HPF Language Processor", NEC Research and Development, Nippon electric Ltd. Tokyo, JP, vol. 39, No. 4, Oct. 1, 1998, pp. 414-421.

Lastovetsky, "Parallel Computing on Heterogeneous Networks", XP055759409, Hoboken, NJ, Retrieved from the Internet: URL:https://citeseerx.ist.psu.edu/viewdoc/download?doi=10.1.1.216.8140&rep=rep1&type=pdf, Jan. 1, 2003, 48 pages.

Tanguy E. Raynaud et al., "A Cache Only Memory Architecture for Big Data Applications", Technical Report No. 8, Jul. 1, 2014, 36 pages.

* cited by examiner

NoC 100

FIG. 8
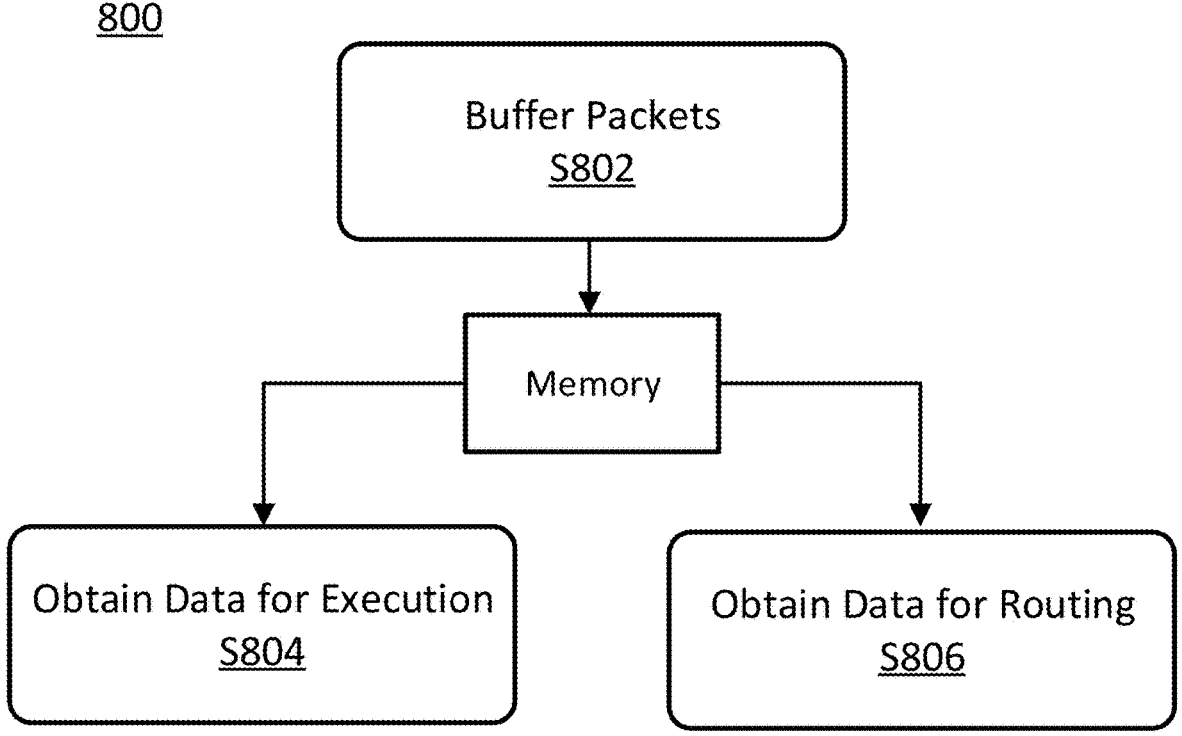
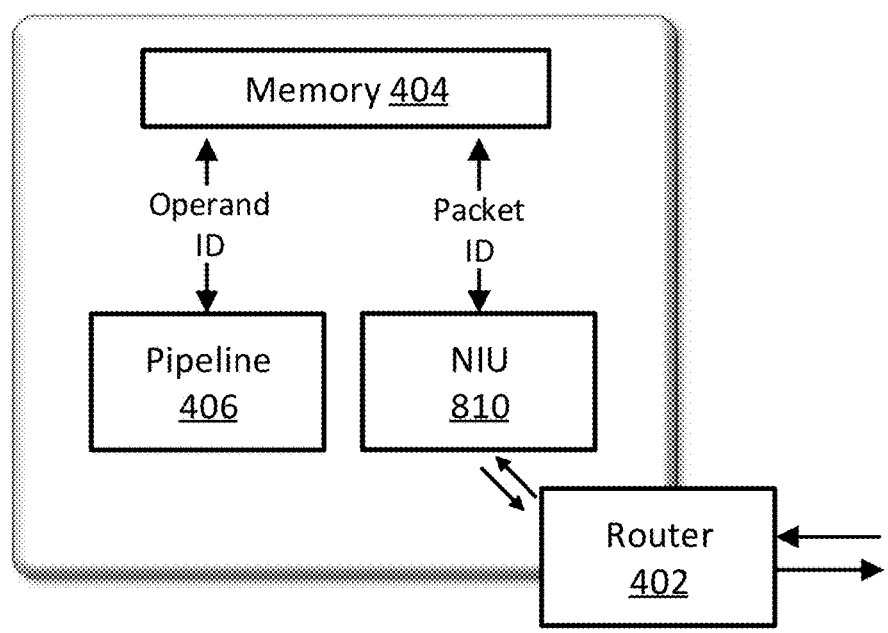

PROCESSOR CORES USING PACKET IDENTIFIERS FOR ROUTING AND COMPUTATION

CROSS REFERENCE TO RELATED APPLICATIONS

This application claims the benefit of U.S. Provisional Patent Application No. 62/863,042, filed Jun. 18, 2019, which is incorporated by reference herein in its entirety for all purposes.

BACKGROUND

As the field of computing has begun to see diminishing returns from a reliance on frequency scaling to improve computational performance, parallel computing has become an increasingly important field of study and opportunity for commercialization. Parallel computing relies on the capability of a computer architecture to break a complex computation into a set of composite computations that can be executed simultaneously, in parallel, by multiple processing nodes. Although this capability is not universal to all potential workloads, enough complex computations can be parallelized in this fashion to render parallel computing the current dominant paradigm for computer architectures.

Parallel computing exhibits certain drawbacks in terms of the increased complexity of breaking down a complex computation into a set of composite computations that can be executed in parallel, and the communication and synchronization between the various computational nodes as they cooperatively execute the complex computation. The communication problem includes not only transmitting the results of the various composite computations so that they can be aggregated to build towards a final result, but also the physical communication of instructions to the various computational nodes so that they know which composite computations they need to calculate. The increased complexity requires a system that not only handles the data computations associated with the complex computation itself but also computations for addressing, packing, storing, and moving the data and instructions that support the complex computation.

In the specific field of multi-core processors, in which the computational nodes are individual processing cores of the multi-core processor, one common system deployed for distributing data amongst the various cores is a network-on-chip (NoC). Each computational node in such a system includes both hardware to conduct computations, in the same manner as for a traditional computer processor, and additionally includes a network interface unit (NIU) and router for managing the movement of data amongst the various processing cores.

FIG. 1 illustrates a portion of a NoC 100 for a multicore processor with four processing cores 101, 102, 103, and 104. The illustrated processing cores are linked using four routers 110, 111, 112, and 113. The processing cores and routers form nodes of the system. The routers communicate with their associated processing core using an NIU located on each processing core. Data used in the execution of instructions by the pipelines of the processing cores 101, 102, 103, and 104 is stored in the memory on each core. The data can include instructions and the values for operands used in the execution of the instructions. When an instruction is executed, that operand data is accessed from the memory, and the computation result is stored back in the memory. When the data stored in the memory is needed on another processing core, the NIU works in combination with the router to package the data, copy the data, and transmit the data through the NoC to another node.

SUMMARY

Methods and systems related to the efficient distribution of a complex computation among multiple computational nodes are disclosed herein. The multiple computational nodes can be processing cores. The multiple computational nodes can be referred to as a network of computational nodes. The computational nodes can each include a router and a processing pipeline. The router of each computational node can be used to route data between the computational node and the other computational nodes in the network. The processing pipeline of each computational node can conduct component computations of the complex computation. The data routed between the computational nodes can be input, intermediate, or output data for the complex computation which is referred to herein as computation data. The computation data can also include instructions on how to conduct the complex computation which are referred to herein as computation instructions.

In specific embodiments of the invention, the network of computational nodes can be configured to obviate the need to reassemble higher level data structures on each of the computational nodes. In these embodiments, data is routed through the network of nodes using the same degree of abstraction from the underlying complex computation as is used by the computational pipeline of each computational node. The resulting network can save resources that would otherwise have been spent packaging, routing, and translating data and spend those resources on conducting the actual computations required for the complex computation which the nodes have been assigned. In these embodiments, the data can be routed using lower level data units, such as packets, and computations can be conducted by the computational nodes using the same lower level data structures. The same data structures can therefore be used to transport, store, and conduct computations across the computational network.

In specific embodiments of the invention, the computation data can be packaged into packets for both routing between the computational nodes via the routers and computation on the computational nodes via the processing pipelines. In specific embodiments, the packetization decreases the latency and improves the performance of a distributed computation system because large data structures, such as large tensors, can be broken into smaller pieces and computation can begin as soon as those smaller pieces are received, instead of waiting for the entire tensor to be loaded into memory on a given computational node. In specific embodiments, the size of the packets can be altered during execution of the complex computation. The resulting packetized complex computation can be executed with a higher degree of parallelization due to this heightened degree of flexibility. At different times, the same network can break computation data into smaller more numerous pieces to take advantage of a higher degree of parallelization in a complex computation, and then break the same computation data into larger less numerous pieces if the overhead of parallelization is not amenable to certain portions of the same complex computation, or to a different complex computation for which the same network is being applied.

In specific embodiments of the invention, the operand identifiers represent packet identifiers in the set of packet identifiers. The representation of packet identifiers by operand identifiers can be the result of using common labels between the two sets or a mapping between the two sets of labels. The representation of packet identifiers by operand identifiers could also be a result of a set of memories on the set of processing cores storing data values in common association with both the set of packets and a set of operands identified by the set of operand identifiers. For example, a memory storing data on a processing core could include a set of memory addresses that are accessed for moving operand data to and from the processing pipeline while the same addresses are accessed for moving routed data to and from other processing cores. Those memory addresses could be accessed using a correspondence between a set of labels associated with the packets and a set of labels associated with the operands. However, those memory addresses could also be accessed using a synchronized correspondence embedded in the execution of the complex computation itself by which a processing core would know to access a given memory address for an operand and to read from that same given memory address for routing the data to another processing core.

In specific embodiments of the invention, the computation data is represented using the same degree of abstraction by the routers and processing pipelines by labeling the data routed between the computational nodes and the data upon which the processing pipeline operates using a common language. The common language can be a set of labels that are used to both route the data between computational nodes and execute computations on the processing pipelines. For example, a router associated with each computational node could identify data units using a set of data unit identifiers and a processing pipeline associated with each computational node could refer to those same units of data using that same set of data unit identifiers.

In specific embodiments of the invention in which the computation data is packetized, the labels mentioned in the prior paragraph could be packet identifiers. The data units could be packets of data such that the router referred to them using packet identifiers, while the processing pipeline also used the packet identifiers. In specific embodiments of the invention, the processing pipeline could use a set of operand identifiers that was in the set of packet identifiers. In specific embodiments of the invention, the processing pipeline could use a set of operand identifiers that represent the packet identifiers.

In specific embodiments of the invention, the same degree of abstraction could be realized through the use of a mapping from: (i) a set of labels used to route computation data between computational nodes and a set of labels used to execute computations on the processing pipeline using that computation data; back to (ii) an underlying set of data units associated with the complex computation. For example, the complex computation could be described at a high level of abstraction by using a reference to a set of application datums and the sets of labels mentioned above could each be unambiguously mapped back to the same set of application datums. In specific embodiments of the invention, the unambiguous mapping from the labels to the application datums will remain globally unambiguous, across the processing cores, throughout the execution of the complex computation. The mapping can be kept globally unambiguous through mutually exclusive temporal use of a given label, through the use of mutually exclusive labels, through the mutually exclusive localized use of a given label, or any combination of these approaches.

In specific embodiments of the invention, the computational nodes are processing cores and the complex computation is the execution of a directed graph. The processing cores can each have a processing pipeline, a memory, and a router. In these embodiments, the network can include the routers, inter-processor buses, and a multi-core data routing protocol such as a proprietary network on chip (NoC) protocol. However, the computational nodes could be any type of computational unit at any scale including, artificial neurons, CPUs, GPUs, ASICs, FPGAs, server blades, servers, or computing clusters. Furthermore, the computational nodes do not need to be co-located on a single board or even in a single locale and can be located in entirely different physical locales. Furthermore, the protocol used to route data between the computational nodes can be any networking protocol that is compatible with the computational nodes including RDMA, RoCE, PCIE, HyperTransport, InfiniBand, Ethernet, UDP, TCP/IP, IEEE 802.11, GPRS, or any other wired or wireless packet-based network protocol.

In specific embodiments of the invention a method is provided. Each step of the method can be executed by a processing core operating in combination with a set of processing cores in the execution of a complex computation. The method includes routing a set of packets using a router on the processing core and a set of packet identifiers. The set of packet identifiers uniquely identify the packets in the set of packets across the set of processing cores. The method also includes executing a set of instructions using a processing pipeline on the processing core. In specific embodiments of the invention, the set of instructions include a set of operand identifiers and the operand identifiers in the set of operand identifiers represent packet identifiers in the set of packet identifiers. In specific embodiments of the invention, the set of instructions include a set of operand identifiers and the set of operand identifiers and the set of packet identifiers can each be unambiguously mapped to an underlying set of application datums. The application datums can represent the complex computation data at a high level of abstraction. For example, the application datums could be variables in a source code description of the complex computation. In specific embodiments of the invention, the processing pipeline uses the packet identifiers to execute the set of instructions.

BRIEF DESCRIPTION OF THE DRAWINGS

FIG. 8 is a flow chart for a set of methods and schematic representation of a processing core in accordance with specific embodiments disclosed herein

DETAILED DESCRIPTION

Methods and systems related to the efficient distribution of complex computations between multiple computational nodes in accordance with the summary above are disclosed in detail herein. The methods and systems disclosed in this section are nonlimiting embodiments of the invention, are provided for explanatory purposes only, and should not be used to constrict the full scope of the invention. Throughout this disclosure the example of a computational node, in the form of a processing core, which is executing a complex computation, in the form of a directed graph, is utilized as an example. However, and as mentioned in the summary, the computational nodes can be any networked computational unit, and the complex computation can be drawn from any field which requires numerous computations to be rapidly and efficiently executed in parallel by multiple computational units.

The processing cores mentioned in this portion of the description include a router, processing pipeline, and a memory. However, they could also include additional or more specific elements such as a higher-level controller, serializer/deserializer, nonvolatile memory for modifiable configuration information, a volatile memory such as an SRAM, and any number of arithmetic logic units and other fundamental computation units. The processing cores can also include a network on chip (NoC) layer for interfacing with the remainder of the processing cores. The NoC layer could allow the processing core to push data to the correct core or obtain data therefrom. The NoC layer could be a software layer built to interoperate with an existing processing core router. Alternatively, the NoC layer could be a customized hardware device serving as the router itself. In embodiments in which the computation data is packetized, the processing pipeline can include a bus for accessing the memory, an unpacking block, a computation block, a packing block, and another bus for writing to the memory.

The complex computations disclosed herein can include the execution of a directed graph. The directed graph can be described using application code (e.g., a source code description of an algorithm). The directed graph can represent a machine learning algorithm such as an artificial neural network (ANN) or support vector machine. The directed graph can also represent a hashing, encryption, decryption, or graphics rendering algorithm involving a large number of component computations. In particular, the directed graph can represent algorithms requiring a high level of parallel processing such as a ray casting algorithm.

Figure 1:
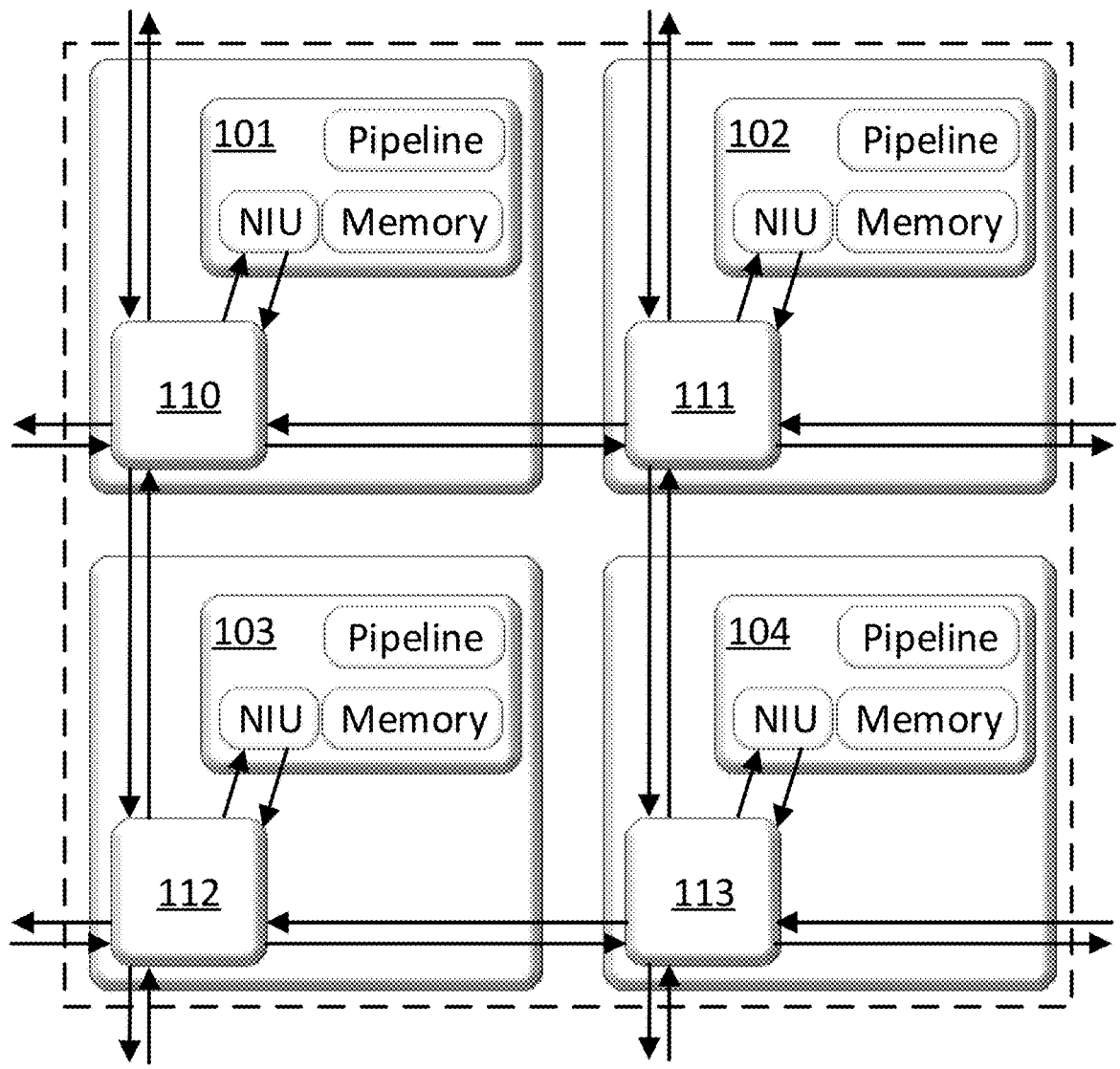
FIG. 1 is a block diagram of a portion of a NoC connecting multiple processing cores in a multicore processor in accordance with the related art.
Figure 2:
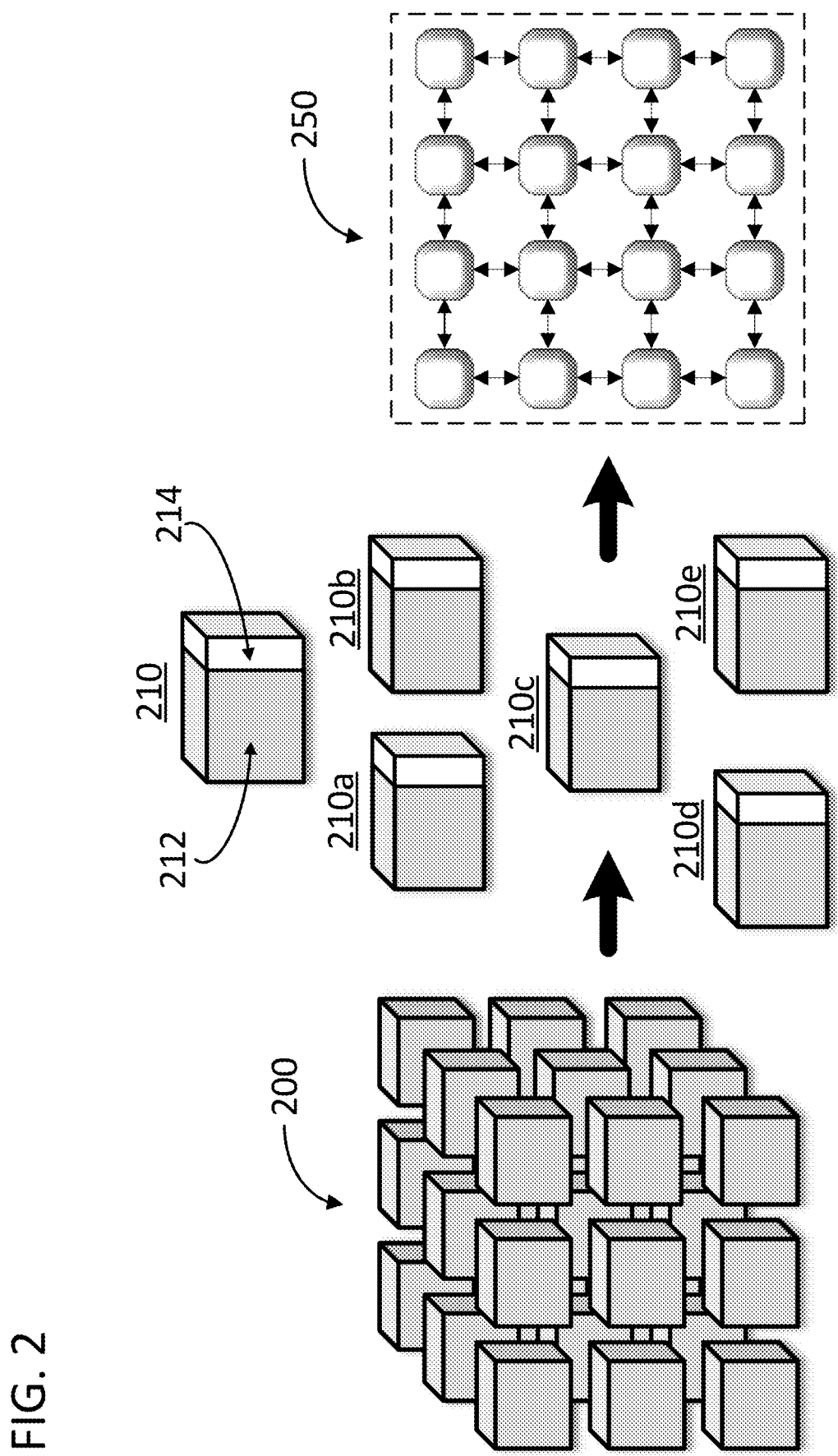
FIG. 2 is an illustration of the packetization of large tensors of computation data for the distribution of a complex computation among a network of processing cores in accordance with specific embodiments disclosed herein.

FIG. 2 illustrates a set of computation data 200 in the form of 27 massive tensors. In the case of the complex computation being the execution of a directed graph that represents an ANN, the tensors can be multidimensional data structure each with a number of individual datums on the order of millions or billions. In accordance with specific embodiments disclosed herein, those tensors can be packetized by being divided into a large number of packets, such as packets 210, 210a, 210b, 210c, 210d, 210e, each having a payload 112, containing computation data, and a header 214, which can include data used to identify and describe the payload of the packet. As described herein, these packets 210 can then be used to execute the complex computation. In the illustrated case the complex computation includes the execution of a directed graph representing an ANN using a network of processing cores 250. In particular, the execution of the directed graph includes the generation of an inference from the ANN. Throughout the execution of the complex computation, the packets, such as packets 210, can serve as the main unit of exchange, storage, and computation across the network of processing cores, such as network 250. In specific embodiments of the invention, the header, such as header 214, can include a packet identifier used to refer to the packet for purposes of exchange, storage, and computation across the network of processing cores. In these embodiments, the processing pipelines and routers of all the processing cores can all refer to the packets at the same level of abstraction (e.g., the packet identifiers).

Figure 3:
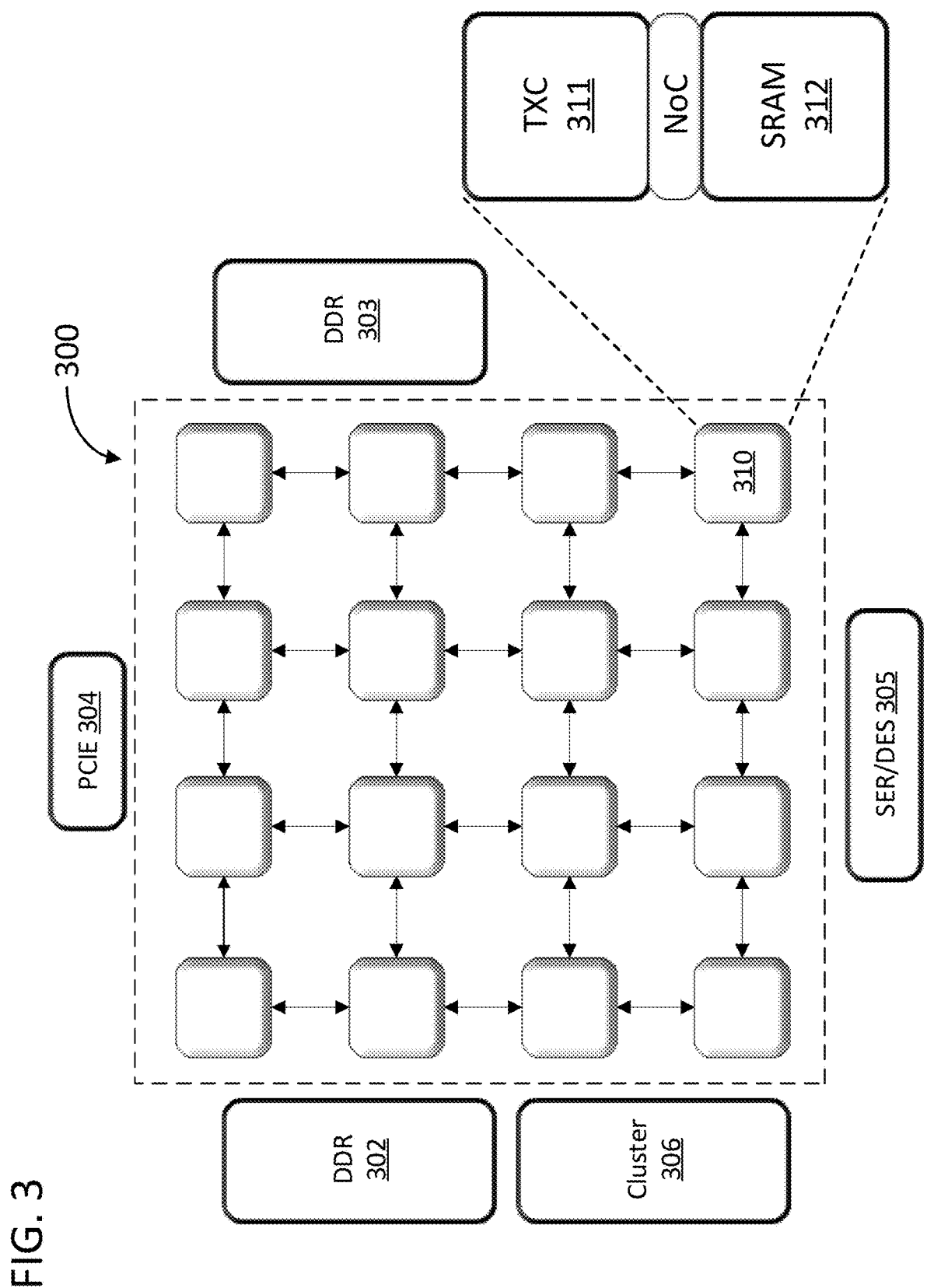
FIG. 3 is a block diagram of a network of processing cores in accordance with specific embodiments disclosed herein.

In specific embodiments of the invention, a network of computational units can include a set of processing cores located on a single chip and networked via a mesh of buses or interconnect fabric and a set of routers on each of the processing cores communicating via a proprietary NoC protocol. FIG. 3 illustrates a set of processing cores 300 on a single chip along with peripheral support circuitry. In the example of FIG. 3, peripheral support circuitry is illustrated as Double Data Rate (DDR) memories 302 and 303, Peripheral Component Interconnect Express (PCIE) interface 304, Serializer/Deserializer 305, and cluster 306, that can be for example a 4 core ARC cluster. However, the peripheral support circuitry can include any component necessary for supporting the overall processing. The processing cores each can have a router and are able to unicast or broadcast commands and data on the mesh of buses. Each processing core can push or pull data from one or multiple cores in the mesh. In specific embodiments of the invention, the push or pull of data on the mesh of buses is orchestrated at the packet level with commands and requests referring to computation data via packet identifiers. In specific embodiments of the invention, the packet identifiers are globally unique across a set of cooperating computational nodes. For example, a single processing core in the network shown in FIG. 3 could thereby be able to broadcast a request for a specific packet of computational data without knowing anything about where the data was stored on the network. Numerous additional advantages accrue to approaches in which the packet identifiers are globally unique and unambiguous across the network.

The processing cores in FIG. 3 can include a low-level transmission control (TXC) layer, represented by TXC 311 in processing core 310. The low-level transmission control can include a router in the form of a set of buffers, an allocator, and a configurable cross bar. The processing core can also include a NoC layer implemented in hardware or software and responsible for the higher-level routing and flow control logic of the NoC. The processing cores can also include a local memory, such as SRAM 312 in processing core 310 in FIG. 3, where data is written to/read from for interfacing with the network. The memory, such as SRAM 312, can be the main memory of the processing core and can be accessed by the processing pipeline and the NoC layer. The NoC layer and processing pipeline can access the memory using identifiers that are unambiguously mapped to an underlying set of application datums. The NoC layer and processing pipeline can access a set of memory addresses that are each commonly mapped to identifiers used by the NoC layer and identifiers used by the processing pipeline. The identifiers can be physical labels in data or the emergent result of the synchronized execution of a complex computation by the set of processing cores.

In keeping with the example of FIG. 2, computation data can be stored in packets that are routed among the different processing cores and utilized by the computational pipeline using a description of the computation data at the same level of abstraction. For example, a tensor of the complex computation could be a portion of a weight tensor "W1" and a component computation of the complex computation could be a convolution between W1 and a portion of an activation tensor "A1." In this example, and assuming that said component computation was being assigned in its entirety to a single processing core, both the router and processing pipeline of that processing core could refer to the two units of computation data as "W1" and "A1," with the router responsible for receiving A1 from another processing core, while the processing pipeline was responsible for retrieving W1 and A1 from the internal memory of the processing cores, executing the convolution, and storing the result back in to memory.

In specific embodiments of the invention, the memories of the processing cores can store routines for executing instructions. The instructions can be specified according to one or more operands and an operation code. In keeping with the example above of the convolution between tensors W1 and A1, the instruction would be an identification of the operation "convolution" and an identification of the two operands "W1" and "A1." The identification of the operation could be specified using an operation code as that term is used by those of ordinary skill in the art. The operations could also be convolutions, matrix multiplications, concatenations, tensor slices, Hadamard products calculations, tensor flatten calculations, tensor transpose calculations, and other computations. The specific set of instructions the processing core is configured to execute can depend on the applications the processing core is optimized for with the aforementioned list of instructions being amenable to use in the execution of a directed graph representing an ANN. The processing pipeline can take in both data and instructions from the memory in order to execute those operations, and then store the output in the memory.

In specific embodiments of the invention, the routers of the processing core can route data using labels for the data. For example, the data could be provided with a data identifier and the data identifier could be used to send requests for data to other processing cores, to send data for a specific core, or to broadcast data to every core in the system. In embodiments in which the computation data was packetized, the labels could be packet headers and the data identifiers could be packet identifiers.

In specific embodiments of the invention, both the router and the processing pipeline of the processing cores can refer to the data of the complex computation at the same level of abstraction to increase the performance of the overall system by limiting the need for translation and other steps. In particular, the processing pipeline can use operand identifiers for the operands of the operations it will conduct that represent the data identifiers that are used by the router to move data through the system. In embodiments in which the computation data was packetized, the identifiers used in this manner could be packet identifiers. For example, if the complex computation were the execution of a directed graph representing an ANN, the computation data in the form of weights, inputs, outputs, and accumulation values could be stored as the payload of packets and the header of the packets could include a packet identifier associated with that computation data. Once the data of the complex computation was packetized both the router and the processing pipeline could conduct operations using reference to the same packets. The packet identifiers could, of course, be used by the router to identify packets coming and going from the router, but the packet identifiers could likewise be used by the computational pipeline to retrieve data from memory to conduct operations thereon. The operand identifiers could represent the packet identifiers either directly, by being identical, or indirectly, by being related through a mapping. Such a mapping could be local to the processing core or global to a set of processing cores conducting a computation. The mapping could also be an actual data structure stored in memory or it could be represented by a basic translation implemented in logic such as a conversion from binary coded numerals to true binary.

The manner in which a computational pipeline uses the packets can depend on the architecture of the pipeline and other factors. In a basic example, the string of data used by a router to label a portion of computation data will be identical to a string of data used by a processing pipeline as a label to identify that same portion of computation data. Effectively, in these embodiments a set of operand identifiers will be in the set of packet identifiers for a given complex computation such that using the processing pipeline can use the packet identifiers in the same way that it uses operand identifiers to retrieve data from memory. The memory can be a cache memory on a processing core such as SRAM 312. Specifically, the processing pipeline will store the computation data at a specific address in the memory on the processing core and store that address in association with the packet identifier. When an instruction includes an operand with that packet identifier, the processing core will retrieve the data stored at the associated address. In other examples, a mapping such as the one described above can be utilized in order to retrieve the correct data for a given operation while the packet identifier is still used in order to initiate the access of the data via the mapping. In other examples, the operand identifiers used by the processing pipeline will be themselves memory addresses in the memory and the packet identifiers will be used to assure that the network delivers the data to that same memory address prior to execution of the instruction. The routing system, such as the NoC layer can throw a flag to indicate that the data is available at the memory location when the packet has been written to the memory. In other examples, the NoC layer can deliver the memory address to a processing core controller when the data is written to the memory.

Embodiments in which the computational data is packetized exhibit certain benefits. As mentioned above, packetizing allows for large data structures to be broken into smaller pieces upon which computations can be executed before the entire data structure has been received by a computational node. In addition, as stated previously, packetizing in flexibly sized packets can allow a set of processing cores to modify the degree of parallelization being utilized for a given computation at a given time based on the immediate characteristic of the computation. Furthermore, packetizing allows different kinds of data structures to be used to store the computational data at the same time without creating conflicts. As the packets become discrete entities in their own right, the same data structure can be partially represented using two data types by simply placing them in different packets. The computational side of the system can also benefit from this siloing of data in that it is easy to keep track of which types of computational hardware needs to be utilized for conducting operations on which packets. For example, if it is determined that one weight tensor W2 is more influential on the output of a given complex computation than another weight tensor W3, W2 can be stored in a packet with high resolution datums such as 16-bit floating point while W3 is stored in a packet with lower resolution datums such as 8-bit integer. The resolution of different packets can also be modified at run time using this approach. The header of the packet can be updated by the processing pipeline to reflect this change.

Figure 4:
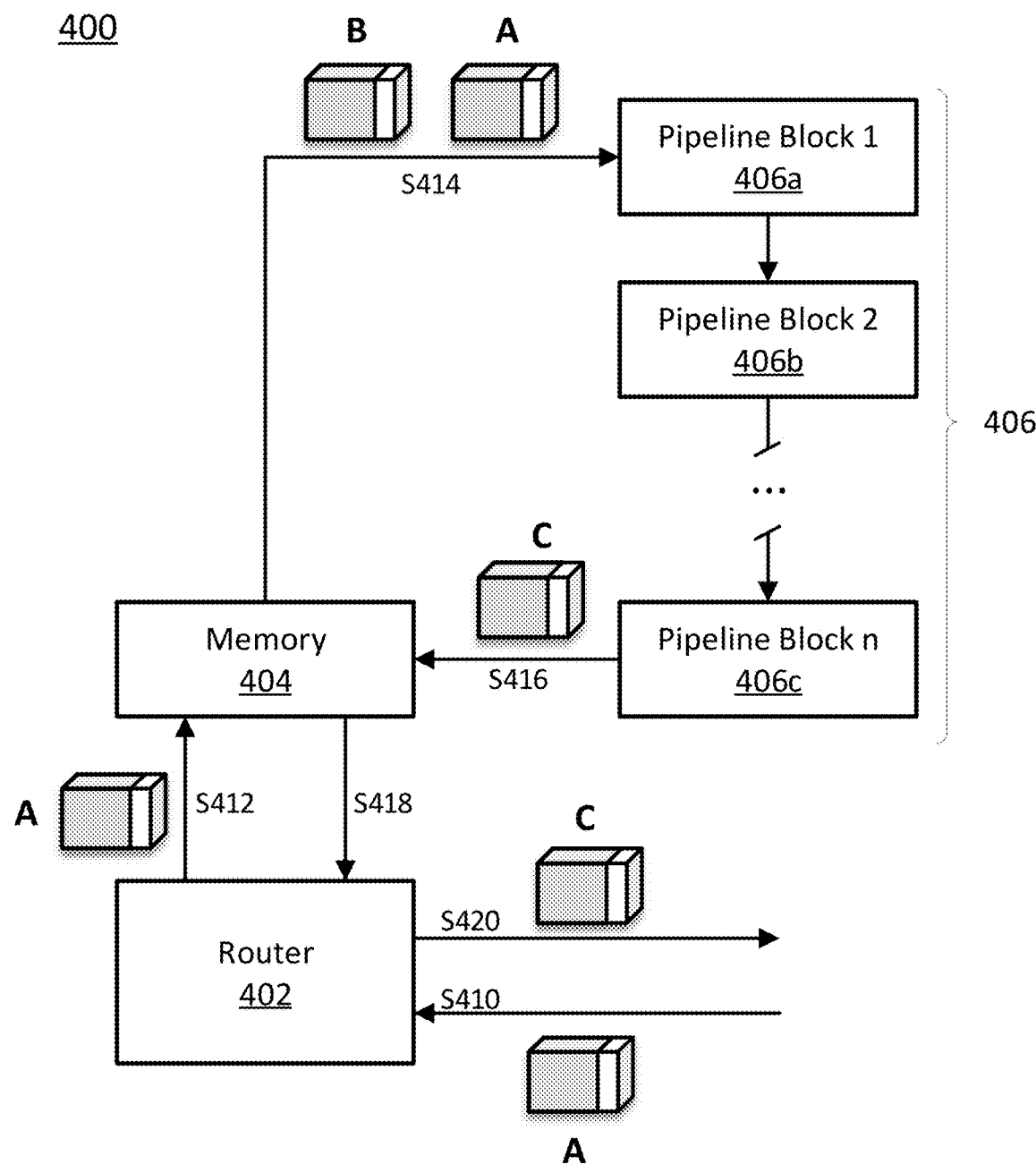
FIG. 4 is a block diagram of a computational node in the form of a processing core in accordance with specific embodiments disclosed herein.

FIG. 4 provides a block diagram 400 of a processing core, such as processing core 310 of FIG. 3, that is in accordance with specific embodiments of the invention disclosed herein. As seen, the processing core includes a router 402, a memory 404, and a processing pipeline 406, represented by a plurality of "n" pipeline blocks 406a, 406b, and 406c. The router 402 can store received packets in memory 404 and pull packets from the memory 404 for transmission to other processing cores. As illustrated, the router 402 is receiving a packet "A" in step S410, and storing it in memory 404 in step S412. The memory 404 can store the data for packet A along with a packet identifier for packet A by writing the packet identifier into a specific address in memory known to the processing pipeline 406 and router 402 to reflect the content of the memory address in which the packet data was stored. The memory 404 can store data for the processing pipeline 406 to conduct operations upon as well as instructions for administrating various operations on that data. The pipeline 406 can include basic circuit elements such as registers, latches, and logic gates as well as more complex structures such as floating-point arithmetic logic units. The lines in the figure can be buses which may be able to transport more than one packet at a given time. The processing pipeline 406 can receive packets from memory 404 and process them in accordance with operation codes stored in memory and written in a program for the processing pipeline to execute. As illustrated, the pipeline 406 can receive packets A and B from memory 404 in step S414, and can execute an operation, such as a convolution, between the data in packet A and packet B and create a new packet C for storage in the memory 404, as illustrated in step S416. The new packet C can then be accessed by the router 402 for transmission elsewhere in the network as needed, as illustrated in steps S418 and S420.

In specific embodiments of the invention in which the computation data is packetized, the processing pipeline can manipulate the packets in various ways. The processing pipeline could retrieve the packets, including the packet and header from memory, the processing pipeline could then modify the payload or header of the packet while conducting an operation using the packet, and then store the packet, with the same packet identifier, back into memory. For example, the processing pipeline could compress or decompress the data in the packet, encrypt or decrypt the data in the packet, alter the data type of the packet (e.g., 16-bit floating point to 8-bit integer), or analyze the data in the payload and add a description of the payload to the header. Additional data in the packet header could be modified to indicate the status of the packet as being compressed or decompressed etc. Alternatively, the processing pipeline could use the packet to create a new packet. The processing pipeline could accordingly retrieve the packet from memory, conduct an operation such as a concatenation with another packet, slice operation, or math operation with another packet, and then store a new packet with the resulting data, using a different packet identifier, back into memory. The different packet identifier could be specified in a computation instruction delivered to the processing core. For example, with reference to FIG. 4, the computation instruction could be: "C=A convolution B" which would serve as an instruction to assign the packet identifier "C" to the product of the operation "convolution" with operands "A" and "B." Various operations can be substituted in place of the convolution operation as described above including the identify operation in which the content of one packet would be loaded into the content of a new packet or replace the content of an existing packet.

In specific embodiments of the invention, various stages of the processing pipeline can be configured to execute the various operations described above. For example, a first stage of the processing pipeline could be configured to unpack a packet of computation data and a corresponding final stage of the processing pipeline could be configured to pack either the same or a new packet of computation data. Stages such as the ones described in the prior example could be dedicated for a specific operation and either conduct the operation or not depending upon the status of the incoming data to that stage of the pipeline. For example, a decryption block could be configured to pass through incoming data in a packet if the packet header indicated the data was already in a decrypted state. Additionally, or in the alternative, various stages of the processing pipeline could be configured to execute multiple operations based on the instruction being executed by the pipeline at a given moment. For example, an ALU or FPU could be configured to add, subtract, or conduct more complex operations on a set of input computation data based on a control signal applied to that stage of the pipeline. As another example, a data conversion stage could be configured to alter incoming data into various formats based on a control signal applied to that stage of the pipeline.

In specific embodiments of the invention, matched pairs of processing blocks on either side of the main computation portion of the pipeline could be utilized. The matched pairs of processing blocks on either side of the main computation blocks could include pairs of encryption and decryption blocks, pairs of compression and decompression blocks, pairs of pack and unpack blocks, and other sets of matched operations that put the computation data in a format amenable to computation and storage/transmission respectively. For example, the concept of decompressing and compressing the computation data at these stages is particularly appealing given the fact that the data will have been stored and routed through the system all the way until it is on the verge of being applied to the processing pipeline, and will then be compressed immediately after it has been utilized.

Figure 5:
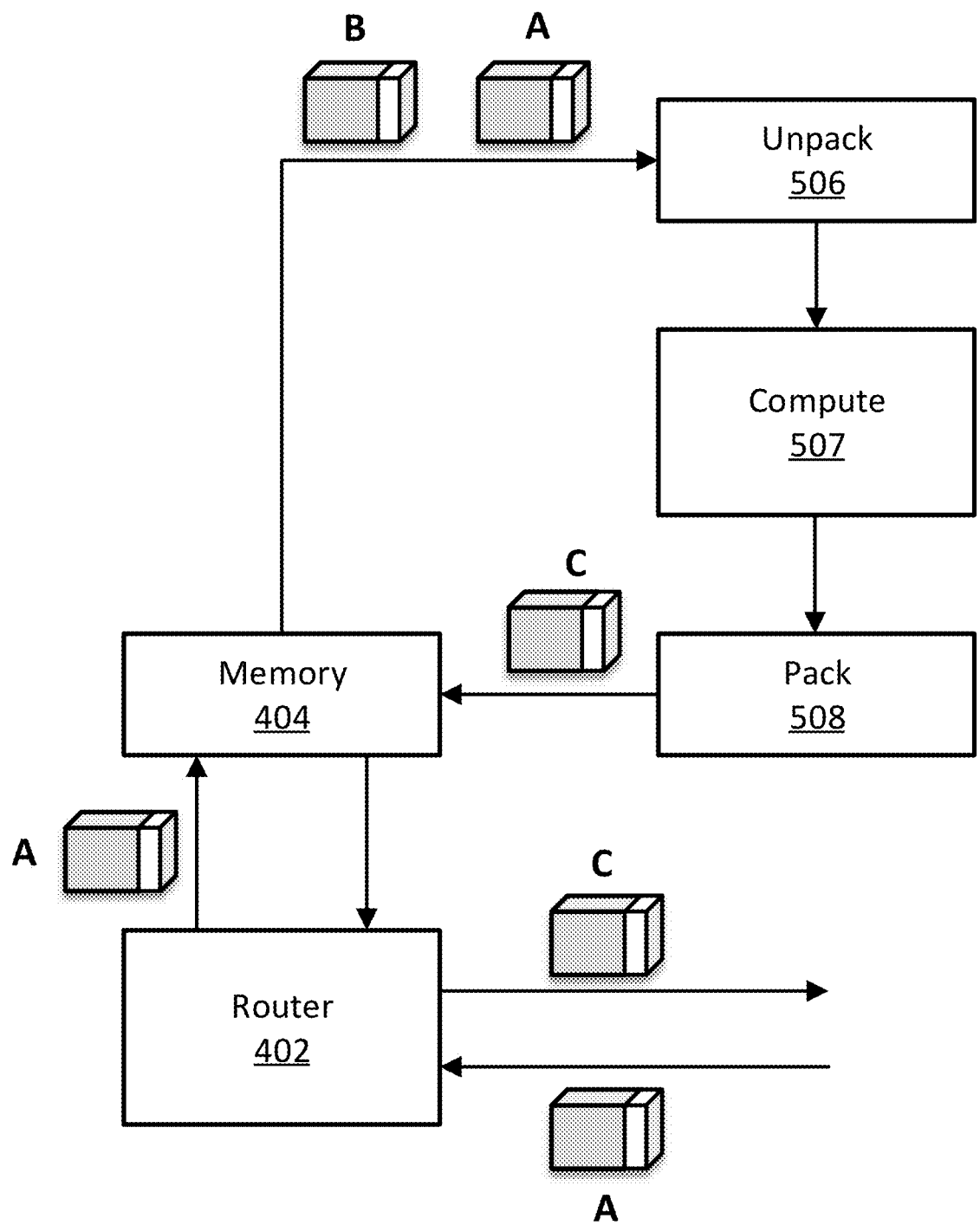
FIG. 5 is a block diagram of a computational node in the form of a processing core with a pipeline bracketed by a packing block and an unpacking block in accordance with specific embodiments disclosed herein.

FIG. 5 illustrates a block diagram 500 that is otherwise in accordance with FIG. 4, but which includes a matched pair of pack and unpack blocks 506 and 508 which bracket the main computation stages of a pipeline, represented by block 507. In embodiments in accordance with FIG. 5, the data in the header and payload could be extracted from packet format in the unpack block 506, and both sets of data could then be applied to the core computational stages of the pipeline for use and modification in those computational stages. In embodiments in accordance with FIG. 5, the data in the header could alternatively be stripped by the unpack block 506 and used solely to control the later stages of the pipeline and be effectively extracted from the main data flow of the pipeline. In specific embodiments of the invention, the unpack block 506 is not needed as the core processing stages operate directly on the packet without the need to extract information from the packet. In specific embodiments of the invention, the unpack block 506 will be responsible for unpacking packets from a set of packets, after obtaining data from the memory 404 for the execution of a set of instructions, and the pack block 508 will be responsible for packing packets from the set of packets prior to writing data from the processing pipeline to the memory 404.

In specific embodiments of the invention, a compiler can be used to instantiate the data structures and execute a complex computation in accordance with some of the embodiments disclosed herein. In these embodiments, the complex computation may first be represented by application code. The application code could be source code written in human readable format. If the complex computation were a description of a direct graph (e.g., drawing an inference from an ANN), the application code could describe the structure of the directed graph and specify its initial state. The compiler could then be used to parse an application code definition of the directed graph and define, based on the parsing, a set of packets to contain the directed graph data. The set of packets could be defined using a set of packet identifiers that uniquely identify each packet in the set of packets. The compiler could further define, based on the parsing, a set of processing core operational codes and a set of operand identifiers to execute the directed graph and a set of operand identifiers. As the compiler has generated both sets of data, the compiler can be configured to assure that the set of operand identifiers is in the set of packet identifiers. In specific embodiments of the invention, the compiler can alternatively generate the set of operand identifiers and set of packet identifiers such that they each unambiguously map back to a set of application datums. The application datums can be variables in the original application code as parsed by the compiler. The compiler can assure that the packet identifiers unambiguously identify the underlying application datums across the set of processing cores while the operand identifiers unambiguously identify the underlying application datums at least across the single processing core on which the associated instructions will be conducted.

In specific embodiments of the invention, the output of a complier can be used to instantiate a directed graph for execution on a set of processing cores. The compiler can also output an assignment of packets for storage on specific processing cores within the set of processing cores to initialize the directed graph for execution and breakdown the instructions of the application code into instructions for execution on individual processing cores in such a way that the execution of the application code is maximally parallelized with minimal memory latency and such that data movement is optimized for that purpose. To that end, the use of a common language for the routing and computation of data is beneficial in that the compiler can schedule data movement and computation without having to add an additional layer of complexity and translation to said scheduling.

Figure 6:
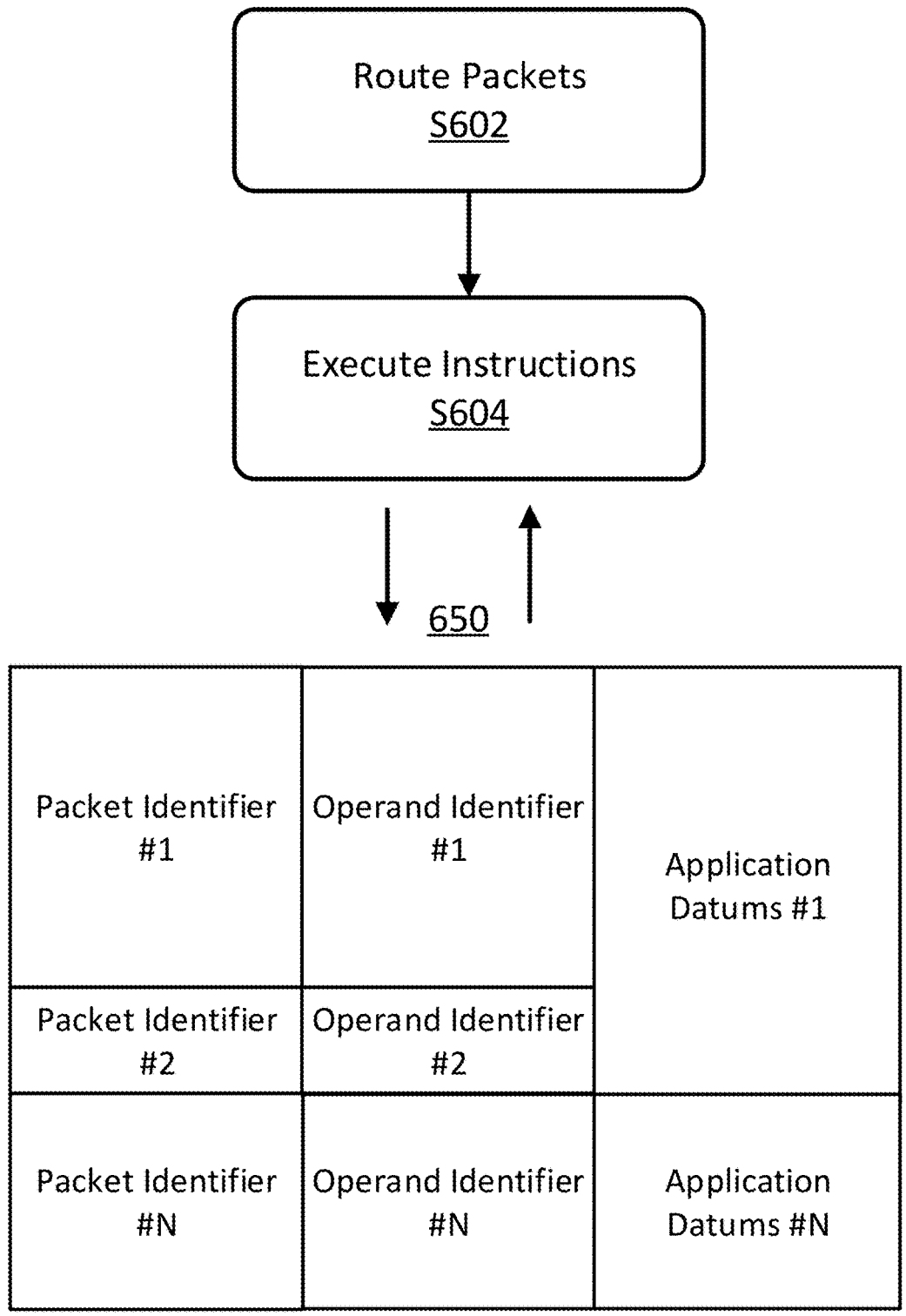
FIG. 6 is a flow chart for a set of methods and schematic representation of a mapping in accordance with specific embodiments disclosed herein.

FIG. 6 illustrates a flow chart 600 for a set of methods for executing a complex computation in accordance with specific embodiments of the present invention. The method can be implemented by using a set of processing cores, such as the NoC described herein. Flow chart 600 starts with step S602 of routing a set of packets between the set of processing cores. This step can be conducted by a set of routers distributed across the set of processing cores. The routers can include the low-level transmission control hardware as well as the higher level NoC control layer mentioned above with reference to FIG. 3. The set of packets can be routed by using packets identifiers that uniquely identify the packets throughout the processing cores.

Flow chart 600 continues with step S604 of executing a set of instructions. This step can be conducted by the set of processing cores. More specifically, this step can be executed by using a set of processing pipelines distributed across the set of processing cores. The processing pipelines can have the characteristics of the processing pipelines described with reference to FIGS. 4 and 5 and can execute instructions in combination with a processing core controller accessing a cache memory of the processing core. The set of instructions can be defined using a set of operand identifiers. In specific embodiments of the invention, the set of operand identifiers and the set of packet identifiers can be unambiguously mapped to an underlying set of application datums of the complex computation throughout the execution of the complex computation. For example, the set of instructions can be composite computations of the complex computation and the underlying set of application datums can be a set of variables in the complex computation. In specific embodiments of the invention, the packets can contain a set of operational codes. In those embodiments, the set of operational codes and the set of operand identifiers can define the set of instructions. For example, "A convolution B" can be considered an instruction where "A" and "B" can be considered the operand identifiers, and "convolution" can be considered an operational code. This is a non-limiting example used for the ease of the explanation only. Instructions, and corresponding operand identifiers and operational codes, can be more complex and of a different form.

FIG. 6 illustrates a non-limiting representation of a map 650 in accordance with specific embodiments of the invention. Map 650 is intended to unambiguously map applications datums of the complex computation to the identifiers used when packetizing the data. As explained before, the complex computation could be described at a high level of abstraction by using a reference to a set of application datums. The packet identifiers used to route computation data between processing cores and the operand identifiers used to execute instructions on the processing cores, using that computation data, could each be unambiguously mapped back to the same set of application datums.

Map 650 is illustrated as unambiguously mapping packet identifiers and operand identifiers to application datums. For example, a first packet identifier #1, will unambiguously correspond to a first set of application datums #1. At the same time, a first operand identifier #1, will unambiguously correspond to the same first set application datums #1. In the illustrated case, packet identifier #1 and operand identifier #1 both correspond in a one-to-one correspondence such that the operand for an instruction using operand identifier #1 would be the entire contents of the packet corresponding to packet identifier #1. The mapping can be implemented in numerous ways. As explained before, the mapping can be directly stored in a data structure. The mapping can be implemented by the provisioning of packets with specific packet identifiers into memory addresses that will be accessed by operands with specific operand identifiers. The mapping can be implemented by the provisioning of operand data with specific operand identifiers into memory addresses that will be accessed to form packets with specific packet identifiers. The mapping can be dynamically generated by the processing cores based on known calculations and instructions. The mapping can be stored in the form of instructions to be performed by the processing core when receiving a packet. Packet and operand identifiers can be mapped to intermediate instructions that will ultimately link back to the original set of application datums. In specific embodiments of the invention, as will be described in more detail below, a set of application datums can be mapped to more than one packet identifier and more than one operand identifier. In this way, application datums #1 can correspond to a first packet identifier #1 and a second set of packet identifiers #2. The set of packet identifiers and operand identifiers will be unambiguously mapped to the set of application datums.

In specific embodiments of the invention, the NoC and/or compiler are able to keep track of, or ex ante define, the spatial distribution of the different cores where packets are being routed to, and define packet identifiers and operand identifiers accordingly. In this way, two or more groups of processing cores spatially distinct can make use of the same identifiers while still being unambiguously mapped to a specific set of application datums. Identifiers can then be recycled within a system and the system can be scaled while using a discrete number of identifiers.

In specific embodiments of the invention, the operand identifiers in a set of operand identifiers represent packet identifiers in a set of packet identifiers. The operand identifiers could represent the packet identifiers either directly, by being identical, or indirectly, by being related through a mapping. In specific embodiments of the invention, the operand identifiers can be included in the packet identifier so that the operand identifiers can be identified by an inspection to the packed identifier. In specific embodiments of the invention, the set of operand identifiers and the set of packet identifiers are the same.

Figure 7:
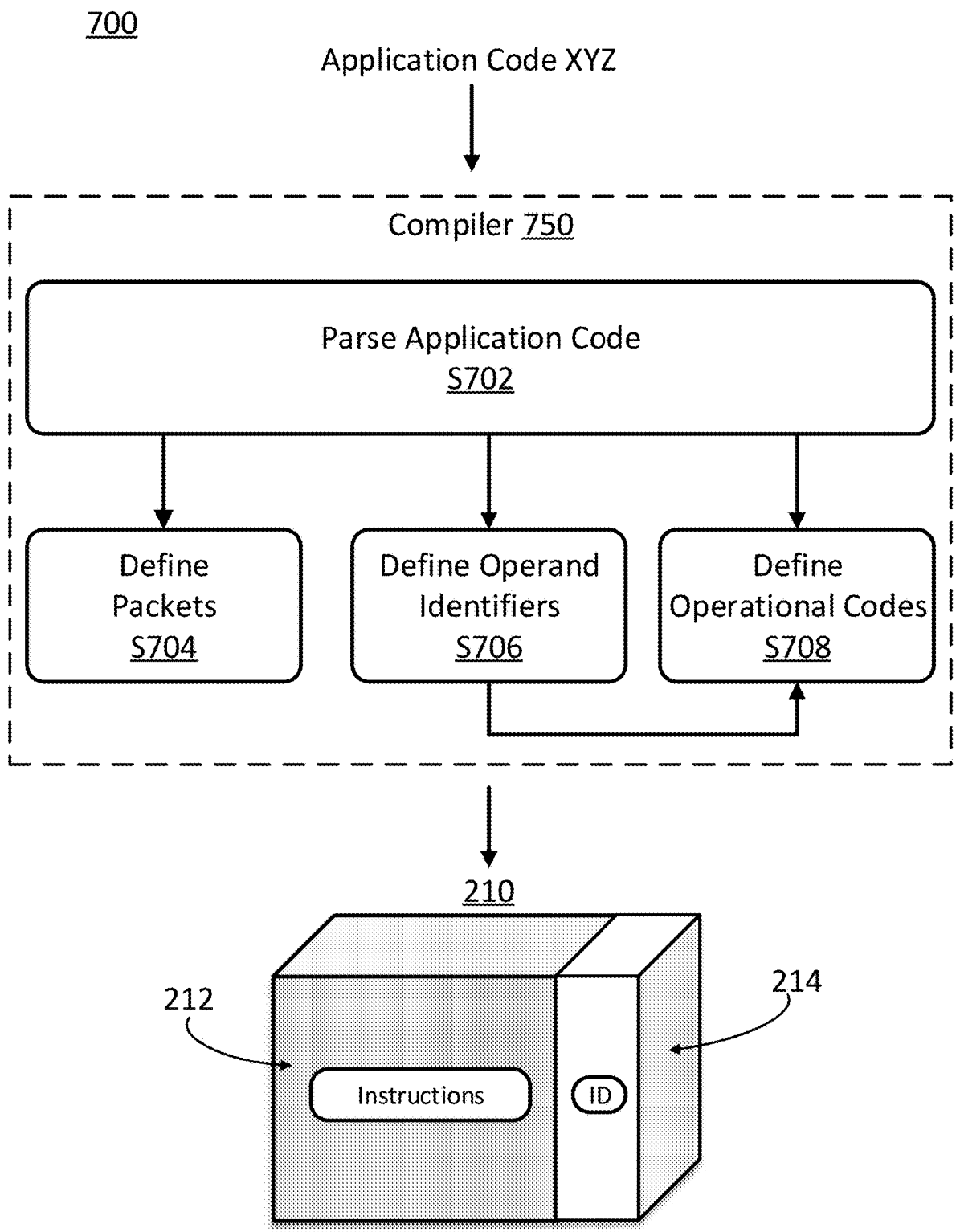
FIG. 7 is a flow chart for a set of methods and illustration of a packet in accordance with specific embodiments disclosed herein.

FIG. 7 illustrates a flow chart 700 of a set of method that can be executed by a compiler. The compiler can be a software module that is able to translate code from one language into another. For example, the compiler can translate code from a high-level programming language into a lower lever programming language. The method starts when the compiler 750 receives an application code definition XYZ of the complex computation. The application code definition can be a source code that defines the complex computation. The application code definition can include the underlying set of application datums described with reference to FIG. 6 as variables in the source code. The application code definition can also include application instructions, as operations in the source code, that use the underlying set of application datums as operands.

Flow chart 700 starts step S702 of parsing the application code definition of the complex computation. In this step, the application code can be analyzed and separated in smaller pieces of code easier to process. Based on the parsing, flow chart 700 continues with step S704 of defining a set of packets, step S706 of defining the set of operand identifiers, and step S708 of defining a set of processing core operational codes to execute the complex computation. As illustrated, steps S704, S706 and S708 can be executed in parallel. However, the steps could be executed sequentially or in any order.

In step S704 a set of packets for parallelizing the complex computation throughout the processing cores are defined. In this step, packet identifiers can also be defined in order to identify each packet. The compiler can be configured to generate packet identifiers for each packet from step S704 and include such packet identifiers in the headers of the packets as they are defined.

In step S706 operand identifiers that characterize a portion of the complex computation are defined. In specific embodiments of the invention, the operand identifiers can be the same as the packet identifiers. In specific embodiments of the invention, the operand identifiers can be included in the set of packets identifiers, for example as a portion or a logic variation of the packet identifier known to the processing cores. In step S708 operational codes that characterize a portion of the complex computation are defined. The operational codes can include the set of operand identifiers as explained before with reference to FIG. 6, and together can represent an instruction to be stored in the packet for execution by the processing cores that receive the packet.

FIG. 7 illustrates an exemplary packet resulting from the compiler processing. The packet can be a packet such as packet 210 of FIG. 2 and can include a header 214 and a payload 212. The header 214 can include the packet identifier as defined by the compiler. The header can also include the operand identifiers or a representation of the operand identifiers. The header can include any information representing the payload and the status of the payload, or any information deemed to be relevant or necessary so as to be represented in the header of the packet. The payload 212 can include the actual content of the packet. The content can be computation data for a complex computation described by the application code. For example, the payload can include the instructions to be executed by processing cores or the data for variables in the application code. In the specific example of FIG. 7, the payload can include the operational code and the operand identifiers defined by the compiler in steps S706 and S708, which can in combination define a set of instructions for the packet.

Multiple packets such as packet 210 can be defined by the compiler in step S704 as a result of the parsing of the application code definition of the complex computation. A subset of those packets can be distributed to the processing cores to initialize them for the complex computation. A subset of packets can contain data values for a single application datum in a set of application datums. In other words, an application datum can be represented by multiple packets in a set of packets defined by the compiler after parsing the application code comprising the application datums. Likewise, a subset of instructions can be composite computations for a single application instruction. In this way, the processing cores can execute a set of instructions by executing a subset of instructions on a processing core prior to receiving all the packets in the subset of packets at the processing core.

FIG. 8 illustrates a flow chart 800 and a schematic view 850 of a processing core in accordance with specific embodiments of the invention. Flow chart 800 starts with step S802 of buffering a set of packets in a memory or set of memories distributed across the set of processing cores. This step can be conducted by a memory, such as a cache memory on a processing core, under the instructions of a processing pipeline, processing core controller, router, NoC layer as described herein. The memories can be the memories internal to each processing core in a NoC such as blocks of SRAM located on the processing cores. The set of packets can be a set of packets generated as described with reference to packet 210 in FIG. 7. This step can take place after a set of packets was defined in step S704 of FIG. 7. This step can take place after the packets are routed in step S602 in FIG. 6.

Flow chart 800 continues with steps S804 of obtaining data for the execution of a set of instructions from the memory or set of memories. The set of instructions can be a set of instructions as defined with reference to FIG. 6. The set of data for execution of instructions can be stored in memory as part of a packet from the set of packets. The set of data for execution of instructions can be obtained from memory using the operand identifiers, for example. In specific embodiments of the invention, a set of processing core controllers conduct the obtaining of data for the execution of the set of instructions by providing the packet identifiers to the set of memories. Alternative approaches for the processing pipeline to obtain data for executing instructions described herein can be used in the execution of step S804 such as the accessing of a known memory address in response to the receipt of a flag from a NoC layer or the accessing of a memory address provided by a NoC layer, or the accessing of a memory address associated with an operand identifier in an instruction being evaluated by the processing core controller.

Flow chart 800 also comprises step S806 of obtaining data for the routing of a set of packets from the set of memories. The set of packets can be the packets generated as explained with reference to FIG. 6 and buffered in memory in step S802. The data for the routing can be obtained using packet identifiers.

Schematic view 850 illustrates a memory, such as memory 404 of FIG. 4 and FIG. 5, wherein packets can be buffered. The processing pipelines of the processing core, such as processing pipeline 406 of FIG. 4, can access the memory 404 and obtain data for execution of instructions. As illustrated, the processing pipeline can obtain data from memory by using the operand identifiers. At the same time, NIU 810 in communication with a router associated to the processing core, such as router 402 of FIG. 4 and FIG. 5, can access the same memory 404 and obtain data for routing of packets. The NIU can be a hardware structure that implements the functionality of the NoC layer as described herein. As illustrated, the data for routing can be obtained by using the packet identifiers. When the operand and packet identifiers are the same, both types of data can be obtained by using a unique identifier. In any case, the identifier used to obtain instructions to be executed by the pipeline of the processing core and the identifier used to obtain data for routing packets will have the same level of abstraction and ultimately correspond to the original application data defining the complex competition, as described throughout this disclosure.

The method steps disclosed herein can be executed by an individual core in a set of processing cores. In specific embodiments of the invention, each individual processing core can execute a part of a method and the overall method can be an emergent property of the plurality of processing cores. The complex computation can then be executed by one or more processing cores acting individually or in combination.

While the specification has been described in detail with respect to specific embodiments of the invention, it will be appreciated that those skilled in the art, upon attaining an understanding of the foregoing, may readily conceive of alterations to, variations of, and equivalents to these embodiments. Although examples in the disclosure where generally directed to drawing inferences from ANNs, the same approaches could be utilized to assist in the distribution of any complex computation. These and other modifications and variations to the present invention may be practiced by those skilled in the art, without departing from the scope of the present invention, which is more particularly set forth in the appended claims.

What is claimed is:

1. A method for executing a complex computation using a set of processing cores, comprising:
routing a set of packets between the set of processing cores using a set of packet identifiers; and
executing a set of instructions using the set of processing cores, wherein the set of instructions are defined using a set of operand identifiers;
wherein the operand identifiers in the set of operand identifiers represent packet identifiers in the set of packet identifiers.

2. The method of claim 1, wherein the operand identifiers in the set of operand identifiers represent packet identifiers in the set of packet identifiers in that:
a set of memories on the set of processing cores stores data values in common association with both: (i) the set of packets; and (ii) a set of operands identified by the set of operand identifiers.

3. The method of claim 1, wherein:
the set of operand identifiers and the set of packet identifiers are the same.

4. The method of claim 1, wherein:
the set of operand identifiers are unambiguously mapped to an underlying set of application datums of the complex computation throughout the execution of the complex computation; and
the set of packet identifiers are unambiguously mapped to the underlying set of application datums of the complex computation throughout the execution of the complex computation.

5. The method of claim 4, wherein:
the set of instructions are composite computations of the complex computation; and
the underlying set of application datums are a set of variables in the complex computation.

6. The method of claim 4, wherein:
the set of packets contain data values for the underlying set of application datums; and
the set of instructions are executed using the data values for the underlying set of application datums.

7. The method of claim 1, further comprising:
parsing an application code definition of the complex computation;
defining, based on the parsing, the set of packets,
defining, based on the parsing, the set of operand identifiers; and
defining, based on the parsing, a set of processing core operational codes to execute the complex computation, wherein the set of processing core operational codes include the set of operand identifiers.

8. The method of claim 7, further comprising:
distributing a subset of the set of packets to the set of processing cores to initialize the set of processing cores for the complex computation.

9. The method of claim 7, wherein:
the set of operand identifiers is in the set of packet identifiers.

10. The method of claim 7, wherein:
the application code definition is source code;
the application code definition of the complex computation includes: (i) an underlying set of application datums; and (ii) a set of application instructions that use the underlying set of application datums as operands;
the underlying set of application datums are variables in the source code; and
the set of application instructions are operations in the source code.

11. The method of claim 10, wherein:
a subset of packets in the set of packets contain data values for a single application datum in the underlying set of application datums;
a subset of instructions in the set of instructions are composite computations for a single application instruction in the set of application instructions; and
executing the set of instructions includes commencing execution of the subset of instructions on a processing core prior to receiving all the packets in the subset of packets at the processing core.

12. The method of claim 1, wherein:
the routing of the set of packets is conducted using a set of routers distributed across the set of processing cores; and
the executing of the set of instructions is conducted using a set of processing pipelines distributed across the set of processing cores.

13. The method of claim 12, further comprising:
buffering the set of packets in a set of memories distributed across the set of processing cores;
obtaining data for the execution of the set of instructions from the set of memories using the set of operand identifiers; and
obtaining data for the routing of the set of packets from the set of memories using the set of packet identifiers.

14. The method of claim 13, wherein:
the set of memories are blocks of SRAM located on the set of processing cores; and
a set of processing core controllers conduct the obtaining of data for the execution of the set of instructions by providing the packet identifiers to the set of memories.

15. The method of claim 13, wherein executing the set of instructions further comprises:
unpacking packets from the set of packets, using the set of processing pipelines, after obtaining data from the set of memories for the execution of the set of instructions; and
packing packets from the set of packets, using the set of processing pipelines, prior to writing data from the set of processing pipelines to the set of memories.

16. A system for executing a complex computation, comprising:
a set of processing cores; and
a set of routers distributed across the set of processing cores;
wherein the set of routers route a set of packets between the set of processing cores using a set of packet identifiers;
wherein the set of processing cores execute a set of instructions;
wherein the set of instructions are defined using a set of operand identifiers; and
wherein the operand identifiers in the set of operand identifiers represent packet identifiers in the set of packet identifiers.

17. The system of claim 16, wherein the operand identifiers in the set of operand identifiers represent packet identifiers in the set of packet identifiers in that:
a set of memories on the set of processing cores stores data values in common association with both: (i) the set of packets; and (ii) a set of operands identified by the set of operand identifiers.

18. The system of claim 16, wherein:
the set of operand identifiers and the set of packet identifiers are the same.

19. The system of claim 16, wherein:
the set of operand identifiers are unambiguously mapped to an underlying set of application datums of the complex computation throughout the execution of the complex computation; and
the set of packet identifiers are unambiguously mapped to the underlying set of application datums of the complex computation throughout the execution of the complex computation.

20. The system of claim 19, wherein:
the set of instructions are composite computations of the complex computation; and
the underlying set of application datums are a set of variables in the complex computation.

21. The system of claim 19, wherein:
the set of packets contain data values for the underlying set of application datums; and
the set of instructions are executed using the data values for the underlying set of application datums.

22. The system of claim 16, further comprising a compiler configured to:
parse an application code definition of the complex computation;
define, based on the parsing, the set of packets,
define, based on the parsing, the set of operand identifiers; and
define, based on the parsing, a set of processing core operational codes to execute the complex computation, wherein the set of processing core operational codes include the set of operand identifiers.

23. The system of claim 22, wherein the compiler is further configured to:
distribute a subset of the set of packets to the set of processing cores to initialize the set of processing cores for the complex computation.

24. The system of claim 22, wherein:
the set of operand identifiers is in the set of packet identifiers.

25. The system of claim 22, wherein:
the application code definition is source code;
the application code definition of the complex computation includes: (i) an underlying set of application datums; and (ii) a set of application instructions that use the underlying set of application datums as operands;
the underlying set of application datums are variables in the source code; and
the set of application instructions are operations in the source code.

26. The system of claim 25, wherein:
a subset of packets in the set of packets contain data values for a single application datum in the underlying set of application datums;
a subset of instructions in the set of instructions are composite computations for a single application instruction in the set of application instructions; and
executing the set of instructions includes commencing execution of the subset of instructions on a processing core prior to receiving all the packets in the subset of packets at the processing core.

27. The system of claim 16, further comprising:
a set of memories distributed across the set of processing cores;
wherein the set of packets is buffered in the set of memories;
wherein data for the execution of the set of instructions is obtained from the set of memories using the set of operand identifiers; and
wherein data for the routing of the set of packets is obtained from the set of memories using the set of packet identifiers.

28. The system of claim 27, wherein:
the set of memories are blocks of SRAM located on the set of processing cores; and
a set of processing core controllers conduct the obtaining of data for the execution of the set of instructions by providing the packet identifiers to the set of memories.

29. The system of claim 27, wherein executing the set of instructions further comprises:

unpacking packets from the set of packets, using a set of processing pipelines, after obtaining data from the set of memories for the execution of the set of instructions; and packing packets from the set of packets, using the set of processing pipelines, prior to writing data from the set of processing pipelines to the set of memories.

30. A method, wherein each step is conducted by a processing core in a set of processing cores executing a complex computation, comprising:

routing a set of packets using a router on the processing core and a set of packet identifiers; and executing a set of instructions using a processing pipeline on the processing core, wherein the set of instructions are defined using a set of operand identifiers;

wherein the operand identifiers in the set of operand identifiers represent packet identifiers in the set of packet identifiers.

* * * * *